June 3, 1969  R. CRAMER, JR  3,447,517
TORQUE CONTROL SYSTEM FOR PRIME MOVERS
Filed May 8, 1967

INVENTOR
ROBERT CRAMER JR
BY
Andrus & Starke
Attorneys

United States Patent Office 3,447,517
Patented June 3, 1969

3,447,517
TORQUE CONTROL SYSTEM FOR PRIME MOVERS
Robert Cramer, Jr., Hales Corners, Wis., assignor to Murphy Diesel Company, Milwaukee, Wis., a corporation of Delaware
Filed May 8, 1967, Ser. No. 636,958
Int. Cl. F02d *31/00, 9/02*
U.S. Cl. 123—97                            8 Claims

ABSTRACT OF THE DISCLOSURE

A prime mover, delivering its output through a torque converter or other slip type transmission to a variable load wherein the ratio of the output shaft speed to the prime mover speed varies as a function of the torque load imposed upon the output shaft, is provided with a controller responsive to the speed of the output shaft to reduce the speed of the prime mover at output shaft speeds above a predetermined working range and also at output shaft speeds below the predetermined working range, thereby controlling the ratio of the output shaft speed to the prime mover speed in ranges both above and below the desired working torque range for the output shaft.

The speed sensor provides a hydraulic pressure varying substantially as a factor of the output shaft speed and which is converted by cam or over-center lever-linkage means to actuate a control lever for the prime mover.

---

This invention relates to a torque control system for prime movers driving through a slip type transmission such as a torque converter.

The control system is constructed to control or limit the maximum output shaft torque approaching stall of the output of the torque converter, and to control or limit the maximum output shaft speed at no load. The system is automatic in that it requires no action by the operator of the machine other than to set the manual control lever in the maximum or full throttle position.

The invention has been specifically applied to the control of internal combustion engines used for driving power shovels, crushing plants and the like through a torque converter and in which the load requires increasing torque as the load resistance becomes suffiicent to substantially reduce engine speed, generally referred to as a "lugging load."

Various systems have been provided heretofore for controlling the high speed range of the torque converter output shaft and limiting its speed as the torque is reduced to zero. The Van de Hay Patent No. 2,958,999 additionally controls or limits the torque as the engine speed reduces to stall, by providing a separate additlional governor mechanism responsive to the output shaft speed.

The present invention employs a single speed sensor responsive to the output shaft speed and the output of the speed sensor is connected to actuate the speed control lever of the engine governor by means of a cam or over-center lever-linkage means to effect the desired reduction in engine speed at opposite ends of the working output range.

For this purpose, in the specific embodiment illustrated and described hereinafter a positive displacement pump driven by the torque converter output shaft delivers fluid such as a relatively incompressible liquid to a chamber having a simple orifice discharge of the fluid back to sump. The pressure in the chamber on the upstream side of the orifice serves to position a spring biased piston which in turn directly actuates an over-center lever-linkage mechanism connected to the throttle or fuel feed control lever for the engine.

Maximum fuel feed to the engine is obtained at the center position of the lever-linkage mechanism and a reduction in fuel feed is effected as the mechanism moves to either side of the center position. A lost motion is provided in the connection to the engine control lever in order to give the desired range of maximum fuel feed to the engine.

The accompanying drawings illustrate a preferred embodiment of the invention constituting the best mode presently contemplated of carrying out the invention.

Figure 1:
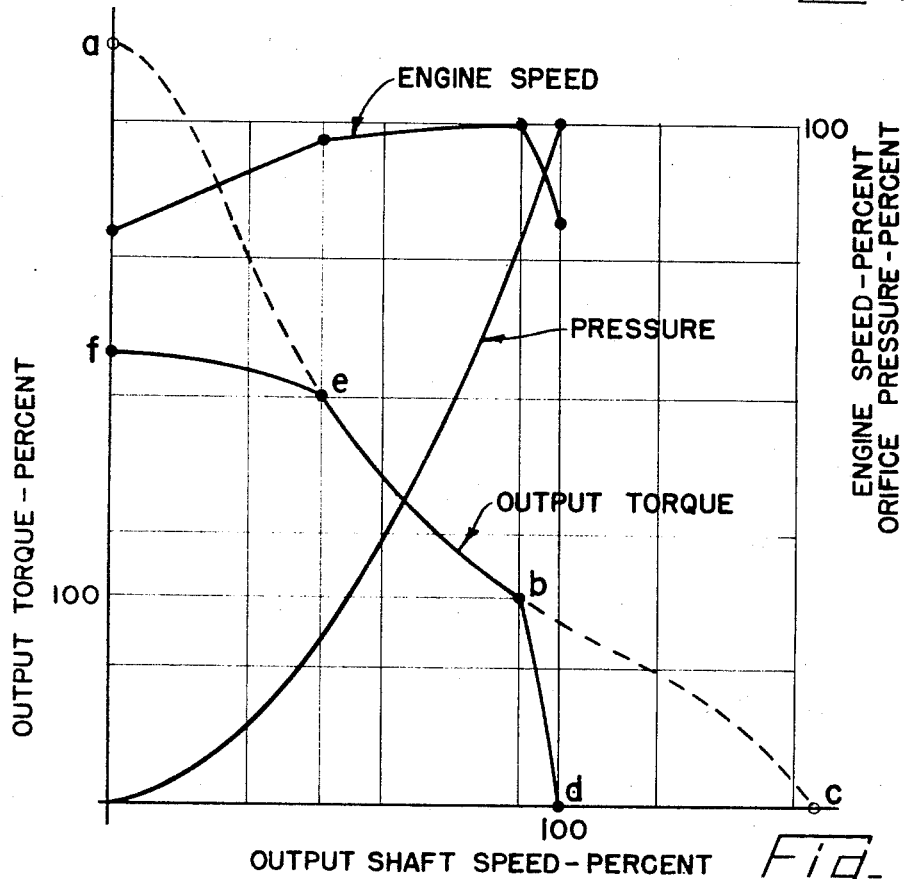
FIGURE 1 is a graph having separate curves indicating changes in output torque, engine speed and fluid pressure, respectively.
Figure 2:
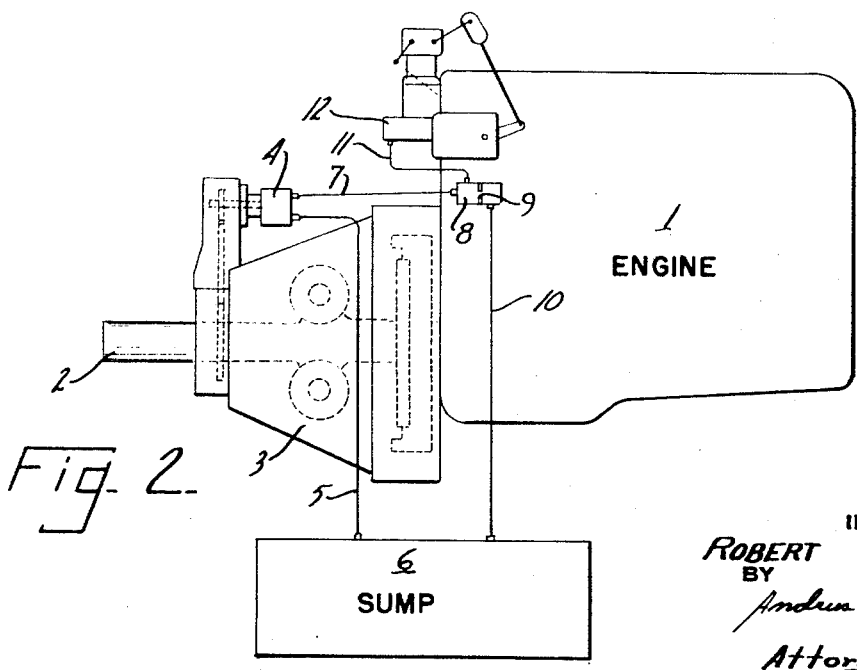
FIG. 2 is a diagrammatic illustration of the system.

Referring to FIG. 1, a normal torque converter at full engine speed produces an output torque curve as illustrated from *a* to *c*, the point *a* showing the torque at zero or stall speed for the torque converter output shaft, and point *c* showing the maximum speed of the output shaft at zero torque.

The portion of the output torque curve *a* to *c* represented by the full line from *e* to *b* is the desirable working range under maximum engine speed at full throttle.

The portion of the output torque curve *a* to *c* represented by the dash line from *a* to *e* shows a very undesirable torque increase as the engine speed approaches a stall condition. It is one of the objectives of the present invention to reduce the increase in torque as the torque converter output speed approaches stall, as represented by the full line *e* to *f*.

The portion of the output torque curve *a* to *c* represented by the dash line from *b* to *c* shows an undesirable speed increase for the output shaft as the torque load is reduced below point *b*. It is one of the objectives of the present invention to reduce the increase of speed as the torque approaches zero, as represented by the full line *b* to *d*.

Point *f* is determined as a safe maximum output torque at stall to avoid damage to the machine being driven.

Point *d* is determined as a safe maximum output shaft speed for convenient operator control purposes.

The present invention generally provides an output torque curve represented by the full lines *f* to *e* to *b* to *d* in which the working range *e* to *b* is generally at maximum engine speed.

In carrying out the invention, the apparatus illustrated in FIGS. 2 to 5, inclusive, has been employed. In this illustration the engine 1 drives an output shaft 2 by means of a fluid torque converter 3 or other slip type transmission.

A positive displacement pump 4 driven from shaft 2 receives liquid through conduit 5 from a sump 6 or other source of liquid, and delivers the liquid through conduit 7 to a pressure chamber 8.

Liquid is discharged from chamber 8 through a simple orifice 9 to a discharge conduit 10 leading back to the sump 6.

In operation the pressure in chamber 8 on the upstream side of the orifice 9 will vary as the square of the speed of output shaft 2. This pressure is transmitted through conduit 11 to a cylinder 12 having a piston shown as a diaphragm 13 bearing against a plunger 14.

The position of plunger 14 against diaphragm 13 is maintained by a calibrated spring 15 encircling the plunger and extending between the end of cylinder 12 and the back of the plunger head engaging the diaphragm 13.

The rear end of plunger 14 extends through the end wall 16 of cylinder 12 into a power cylinder 17 having a power piston 18 operable therein and extending from the far end.

Power fluid is admitted to cylinder 17 through conduit 19 from a suitable source, not shown, to provide a substantially constant fluid pressure within the cylinder and tending to push piston 18 out of the end of the cylinder.

In the construction illustrated the plunger 14 actuates a valve 20 within the cylinder 17 and which opens a discharge output 21 axially through the piston 18 when plunger 14 moves to the left as when the pressure on plunger 14 decreases. When valve 20 opens outlet 21 fluid pressure in cylinder 17 drops and piston 18 is forced back into the cylinder by a spring 22 acting on a follower 23 pressing against the outer end of the piston.

The follower 23 constitutes a roller mounted on one end of a bell crank lever 24 which is actuated by the in and out movements of piston 18 in accord with pressure variations in cylinder 12 and chamber 8.

The opposite end of lever 24 is connected by a short link 25 to one end of a second bell crank lever 26 which in turn has its opposite end connected by a link 27 to the throttle or governor speed control lever 28 for the engine 1.

Figure 3:
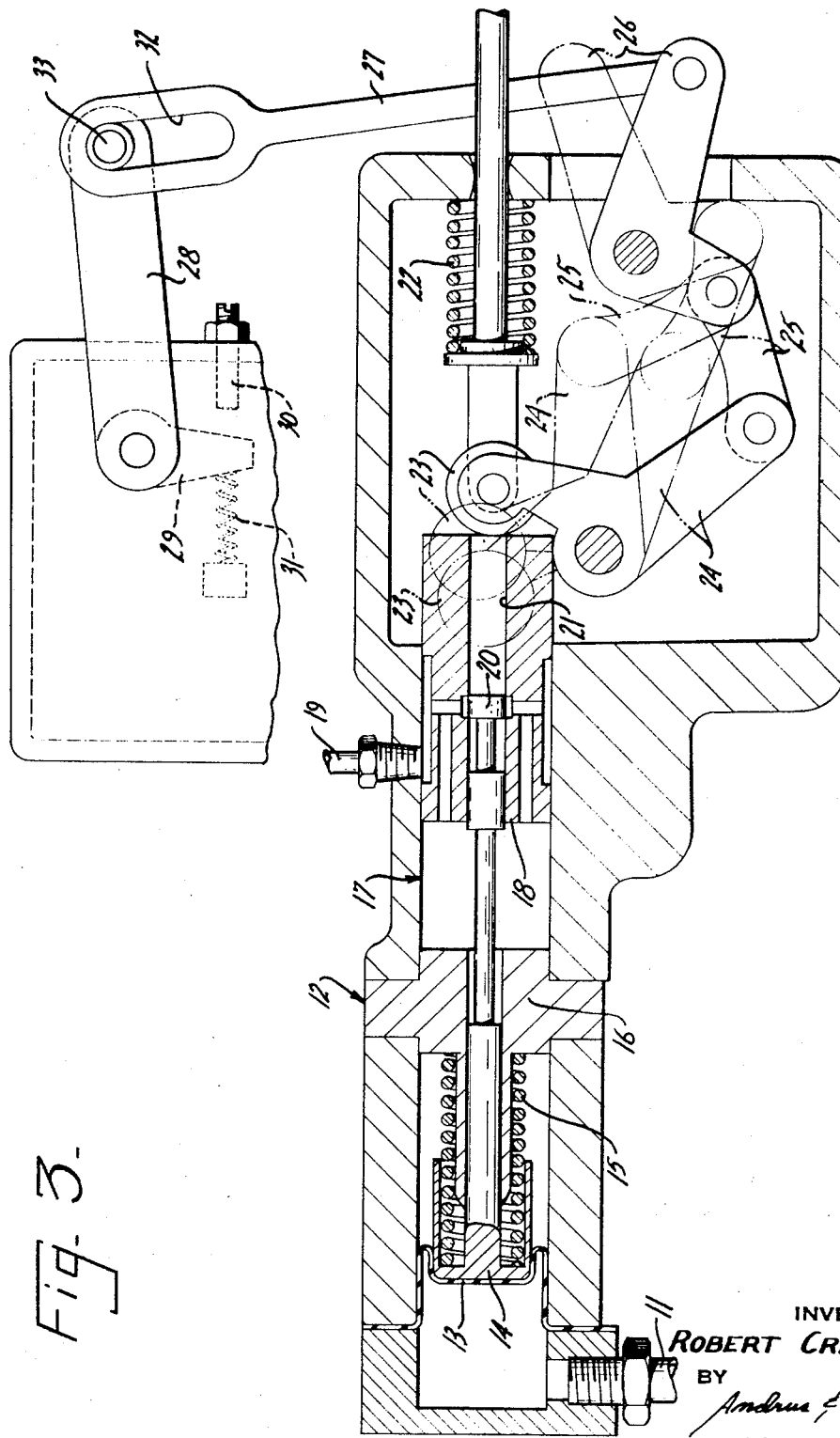
FIG. 3 is a detail semi-schematic illustration of the fluid pressure responsive piston and its over-center lever-linkage connection to the throttle or fuel control lever for the engine, the over-center members being shown as reducing the speed setting of the engine under increasing torque converter output shaft speed at zero load.
Figure 4:
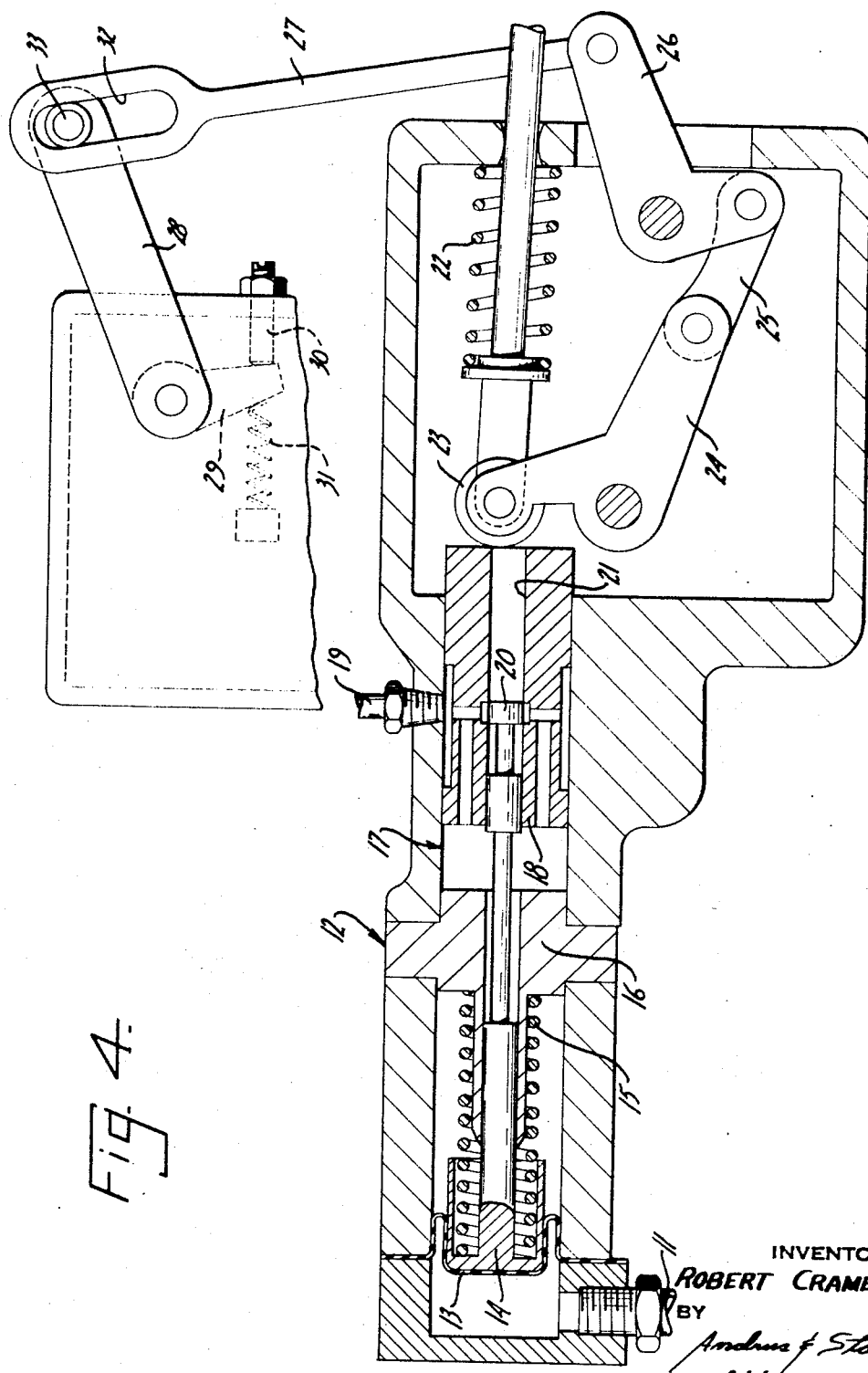
FIG. 4 is a view similar to FIG. 3 with the over-center lever-linkage mechanism at center position giving a maximum engine fuel feed.
Figure 5:
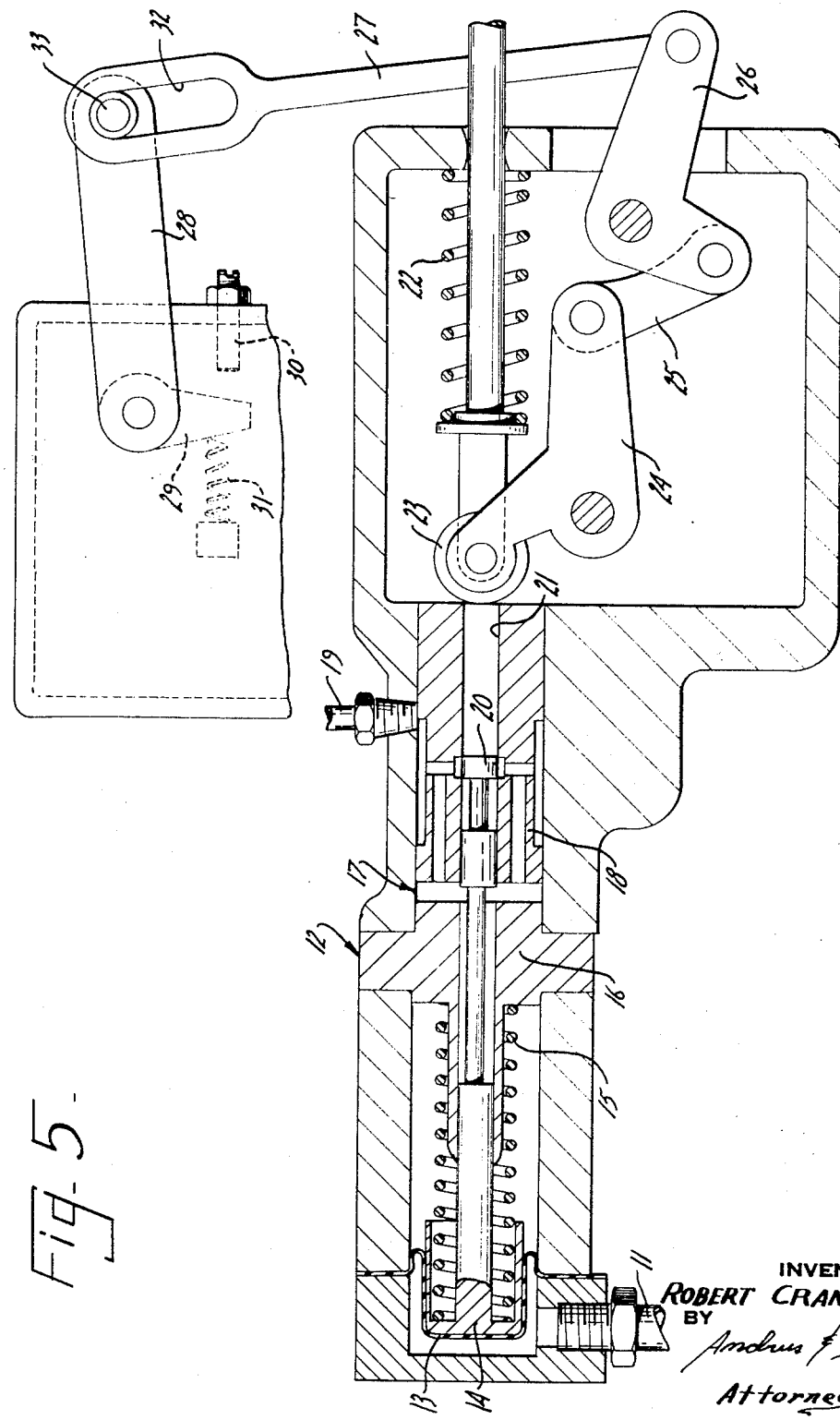
FIG. 5 is a view similar to FIG. 3 with the over-center lever-linkage mechanism at the opposite extreme position reducing the fuel feed to the engine to reduce the output torque as the engine reaches stall conditions.

As shown in FIG. 3 in broken lines and in FIGS. 4 and 5 in full lines the lever-link mechanism 24–25–26–27 has a range of movement wherein link 25 is in alignment with the arm of lever 24 to which it is connected, thereby producing an over-center action giving a maximum movement for link 27 in one direction. Movement of link 25 to either side of the center position effects movement of link 27 in a direction opposite to said one direction.

The fuel lever 28 has an arm 29 which is adapted to engage a stop 30 to determine the maximum fuel feed to the engine 1. A spring 31 biases arm 29 toward stop 30.

The link 27 is provided with a lost motion slot 32 which receives the pivotal pin 33 on lever 28 and provides for an over travel of the link after arm 29 engages stop 30, in the region of the over-center position of the lever-link mechanism 24–25–26–27. This lost motion provides the portion of the operating output torque depicted by curve *e* to *b* in FIG. 1 at which time the engine is operating at maximum fuel consumption and generally at maximum speed. This position of the over-center lever-link mechanism is illustrated in FIG. 4.

When the torque load is reduced toward zero as in that portion of the output torque curve normally depicted by the broken line from *b* to *c* in FIG. 1, the tendency of the output shaft 2 to speed up increases the pressure in the cylinder 12 resulting in a movement of valve 20 to the right closing off outlet passage 21 and thereby hydraulically forcing piston 18 to the right against spring 22, thereby actuating the over-center lever-link mechanism 24–25–26–27 to the position shown in FIG. 3 wherein the fuel lever 28 is pulled downwardly away from the maximum engine speed position toward a lesser engine speed position and arm 29 moves away from its stop 30. The modified torque output curve thus produced is dipicted by the line from *b* to *d* in FIG. 1.

When the torque load is heavy and commences to rise due to slowing of the engine as in the portion of the output torque curve normally depicted by the broken line from *e* to *a* in FIG. 1, the slowing of the output shaft 2 decreases the pressure in cylinder 12 resulting in a movement of valve 20 to the left opening the outlet passage 21 and thereby permitting piston 18 to move to the left under the bisasing influence of spring 22 and actuating the over-center lever-link mechanism 24–25–26–27 to the position shown in FIG. 5 wherein the fuel lever 28 is pulled downward away from the maximum engine speed position toward a lesser engine speed position and arm 29 moves away from its stop 30. The modified torque output curve thus produced is depicted by the line from *e* to *f* in FIG. 1.

While the over-center lever-link mechanism illustrated has been found to give excellent results it is possible to employ a cam and follower mechanism, not shown, with good results.

I claim:

1. A torque control in combination with a prime mover having a slip type transmission in which the ratio of the output shaft speed to the prime mover speed varies as a function of the torque imposed on the output shaft, comprising means to vary the speed of the prime mover, and a single means responsive to the output shaft speed and connected to said first means to: (1) maintain maximum prime mover speed over a substantially predetermined working range of torque output, (2) reduce the prime mover speed by reducing the fuel input thereto upon reduction in torque output below that for said working range, and (3) reduce the prime mover speed by reducing the fuel input thereto upon increase in torque output above that for said working range.

2. The construction of claim 1 in which said last named means comprises a single speed sensor for said output shaft, and means responsive to said speed senor and actuating said first named means.

3. The construction of claim 2 in which said speed sensor comprises a positive displacement pump driven by said output shaft, a pressure chamber having an orifice discharge therefor and connected to receive liquid from said pump, and piston means movable in response to pressure variations in said chamber.

4. The construction of claim 2 in which said means responsive to said speed sensor comprises an over-center lever-linkage mechanism.

5. The construction of claim 3 in which said means responsive to said speed sensor comprises an over-center lever-linkage mechanism.

6. The construction of claim 4 in which a lost motion connection is provided in said over-center lever-linkage mechanism to effect the working range of maximum engine speed.

7. The construction of claim 5 in which a lost motion connection is provided in said over-center lever-linkage mechanism to effect the working range of maximum engine speed.

8. The construction of claim 1 in which the prime mover is an internal combustion engine, the transmission is a torque converter, said speed varying means comprises a speed control lever on a conventional engine speed governor, and said last named means comprises a speed sensing means for the torque converter output shaft and means responsive to said speed sensor and connected to said fuel feed lever.

References Cited

UNITED STATES PATENTS

| | | | |
|---|---|---|---|
| 2,721,072 | 11/1955 | Zuhn | 60—12 XR |
| 2,727,501 | 12/1955 | Worth | 123—103 |
| 2,968,193 | 1/1961 | Frick | 74—859 |
| 3,102,434 | 9/1963 | Cramer | 74—859 |

MEYER PERLIN, *Primary Examiner.*

U.S. Cl. X.R.

123—102, 140; 60—12; 74—859